United States Patent
Bi et al.

(10) Patent No.: US 7,715,844 B2
(45) Date of Patent: May 11, 2010

(54) SPATIAL CHANNEL MODEL WITH A THREE-DIMENSIONAL CLOUD OF SCATTERERS

(75) Inventors: Qi Bi, Morris Plains, NJ (US); Pi-Chun Chen, Lake Hiawatha, NJ (US); Dongzhe Cui, Parsippany, NJ (US); Yifei Yuan, Livingston, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 738 days.

(21) Appl. No.: 11/385,363

(22) Filed: Mar. 21, 2006

(65) Prior Publication Data
US 2007/0225041 A1  Sep. 27, 2007

(51) Int. Cl.
*H04W 16/00* (2009.01)
(52) U.S. Cl. .................. 455/446; 455/424

(58) Field of Classification Search .............. None
See application file for complete search history.

(56) References Cited

U.S. PATENT DOCUMENTS

2004/0259554 A1* 12/2004 Rappaport et al. .......... 455/446

OTHER PUBLICATIONS

Wikipedia: Definition for the word "Autocorrelation" http://en.wikipedia.org/w/index.php?ti... Pages 1-7; Jul. 16, 2009.
Wikipedia: Definition for the word "Correlation Function" http://en.wikipedia.org/w/index.php?ti... Pages 1-2, Jul. 16, 2009.

* cited by examiner

*Primary Examiner*—Philip J Sobutka
(74) *Attorney, Agent, or Firm*—Williams, Morgan & Amerson, PC

(57) ABSTRACT

The present invention provides a method for determining a spatial channel model. The method may include generating a three-dimensional scattering cloud model based on a scattering environment proximate a mobile unit and a configuration of a plurality of antennas.

15 Claims, 3 Drawing Sheets

SPATIAL CHANNEL MODEL WITH A THREE-DIMENSIONAL CLOUD OF SCATTERERS

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more networks. A base station (or alternatively a node-B, base station router, or access network) typically provides wireless connectivity to mobile units located in each cell. The mobile units may include devices such as mobile telephones, personal data assistants, smart phones, text messaging devices, Global Positioning System devices, wireless network interface cards, desktop or laptop computers, and the like. Mobile units located in each cell may access the wireless communications system by establishing a wireless communication link, often referred to as an air interface, with the base station that serves the cell.

The wireless communication link is formed using radio waves that may be transmitted between the mobile units and the base stations. Radio waves experience fading as they propagate from the transmitting end to the receiving end of the wireless communication link. Fading may be defined as a decrease in the intensity of a radio wave as it propagates from a transmitter to a receiver. The most common type of fading is Rayleigh fading, which is caused by scattering of the radio wave by scattering entities (or scatterers) in the environment. For example, Rayleigh fading may be significant in environments that have a large number or density of scatterers, such as the relatively dense distribution of buildings in urban environments. Rayleigh fading typically causes the transmitted radio wave to be received over a range of times, i.e., Rayleigh fading is a type of temporal fading. For example, portions of the radio wave that traveled directly from the transmitter to the receiver without being scattered may arrive at a time $T_1$, whereas portions of the radio wave that have been scattered by a scatterer while traveling from the transmitter to the receiver may travel over a longer distance and therefore may arrive at a time $T_2 > T_1$. Doppler shifting of the signal caused by the relative motion of the mobile unit and the scatterer or antenna may also shift the frequency (or wavelength) of the radio wave.

Rayleigh fading over a wireless communication link may be modeled using a one-dimensional model of a time series of the received signal. For example, the time series of the received signal may be modeled in terms of temporal correlations between portions of the time series, temporal averages of portions of the time series, temporal variances of portions of the time series, and other statistical measures. One exemplary model of Rayleigh fading is the well-known Jakes model, in which the time series is assumed to be generated by a one-dimensional angular distribution of scatterers surrounding the mobile transmitter or receiver. Various parameters of the one-dimensional distribution of scatterers may be varied to match the scattering environment, the speed of the transmitter and/or receiver, the deployment scenario for the transmitters and/or receivers, and other factors. For example, field tests may be used to define input parameters for a Jakes model of a particular environment, such as a neighborhood in an urban environment. The Jake's model may be used for testing, for performance analysis, to estimate capacities, to evaluate the performance of the wireless communication links, and the like in wireless communication systems, particularly those that include a single antenna for transmitting and receiving.

Base stations (and in some cases mobile units) may use more than one antenna for providing wireless connectivity within the cell coverage area. For example, a base station may use multiple antennas for transmitting information to mobile units over a forward link (or downlink) and receiving information from the mobile units over a reverse link (or uplink). Cell coverage and/or throughput can be improved by employing multiple antennas at either the transmitting or receiving end of the wireless communication link using techniques such as transmit and/or receive diversity, intelligent antennas, space-time coding, and the like. These techniques are conventionally referred to as Multiple-In-Multiple-Out (MIMO) technologies.

Temporal models like the Jakes model are able to capture the temporal statistics of the fading in multiple antenna systems, but these one-dimensional models are not able to capture spatial correlations or polarization correlations between the antennas. Two-dimensional models (such as a modified Jakes model) have been developed to model temporal and a portion of the spatial correlations in multiple antenna systems. The two-dimensional Jakes model specifies the geometric location of each scatter within a circular cloud around a mobile unit and then uses this two-dimensional scatter cloud to determine fading coefficients for each antenna. However, two-dimensional models are limited to modeling fading of a single polarization and therefore do not capture the polarization correlations between the multiple antennas. Consequently, these two-dimensional models may only be used to model fading in relatively simple multi-antenna systems, e.g., a four vertical-polarization configuration for 4-branch receiver diversity at the base station. More sophisticated two-dimensional channel models have been proposed but these models typically require extensive computation and take a long time to run. Furthermore, these models provide little or no intuition regarding the propagation physics.

Spatial channel modeling has also been hindered by a number of technical difficulties. For example, modeling spatial correlations requires expensive measurement data that is typically expensive and time-consuming to collect. Furthermore, spatial correlations may be highly dependent on the environment. For example, spatial correlations typically differ significantly between urban, suburban, and rural environments. The spatial correlations may also be different in macro-cell and micro-cell deployment scenarios. For example, the relatively large coverage areas and high vertical displacements of the base station antennas in macro-cell deployments may lead to high spatial correlations between the antennas. In contrast, base station antennas in micro-cell deployments are typically deployed much lower and in regions that may include a large number of scatterers, which may lead to a lower spatial correlation between the antennas. Antenna radiation patterns and the relative position of the mobile unit with respect to the antenna radiation orientation may also affect the spatial correlations. The difficulties are even more pronounced for models of polarization diversity.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for determining a spatial channel model. The method may include generating a three-dimensional scattering cloud model based on a scattering environment proximate a mobile unit and a configuration of a plurality of antennas.

BRIEF DESCRIPTION OF THE DRAWINGS

The invention may be understood by reference to the following description taken in conjunction with the accompanying drawings, in which like reference numerals identify like elements, and in which.

Figure 1:
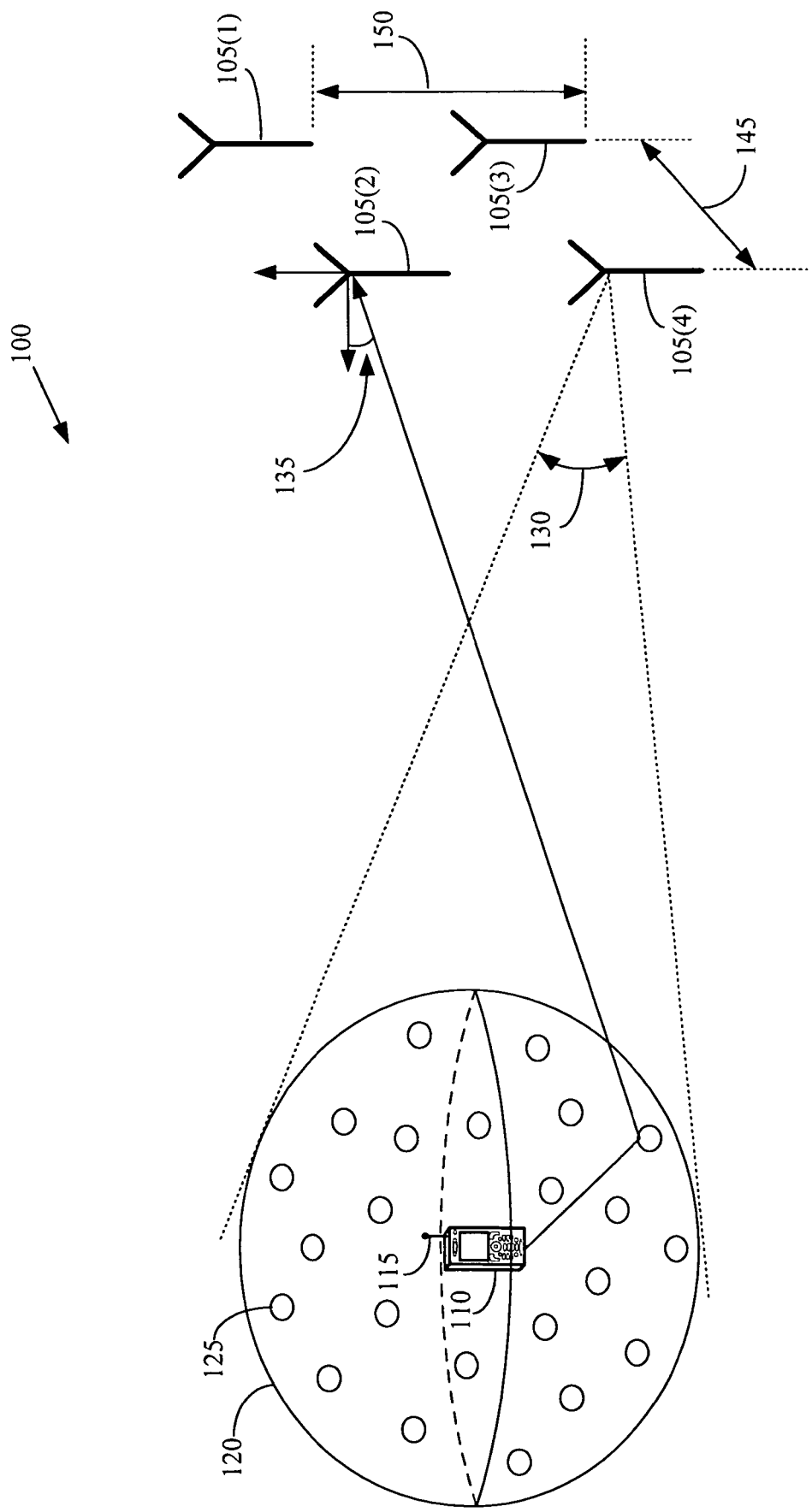
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a plurality of antennas 105(1-4). The indices (1-4) may be used when referring to individual antennas 105(1-4) or to a subset of the antennas 105(1-4). However, these indices may be dropped when the antennas 105 are referred to collectively. This convention may also be used with other elements shown in the drawings. In the illustrated embodiment, the antennas 105 are assumed to be associated with a base station, a base station router, an access network, or some other type of access point. However, in alternative embodiments the antennas 105 may be associated with any device or entity.

The antennas 105 may be used to provide wireless connectivity to a geographical area or cell according to one or more standards or protocols. However, persons of ordinary skill in the art having benefit of the present disclosure should appreciate that the particular standards or protocols used to provide wireless connectivity are matters of design choice and not material to the present invention. Moreover, techniques for providing wireless connectivity are known to persons of ordinary skill in the art and in the interest of clarity only those aspects of providing wireless connectivity using the antennas 105 that are relevant to the present invention will be discussed further herein.

The antennas 105 and one or more mobile units 110 may communicate over a wireless communication link or air interface. Although a single mobile unit 110 is depicted in FIG. 1, persons of ordinary skill in the art having benefit of the present disclosure should appreciate that the antennas 105 may provide wireless communication to any number of mobile units 110. The mobile units 110 may also be referred to using terms such as "mobile terminal," "subscriber terminal," "subscriber station," "access terminal," and the like. Exemplary mobile units 110 may include mobile telephones, personal data assistants, smart phones, text messaging devices, Global Positioning System devices, wireless network interface cards, desktop or laptop computers, and the like. In the illustrated embodiment, the mobile unit 110 includes a single antenna 115 for transmitting and/or receiving radio waves. However, in alternative embodiments, the mobile unit 110 may include more than one antenna 115.

The mobile unit 110 may be deployed in a variety of different scattering environments. For example, the mobile unit 110 may be used in an urban setting, a suburban setting, or a rural setting. The different scattering environments may include different numbers, sizes, and/or densities of scattering entities (such as buildings or other structures or geographical features) and may therefore have very different scattering properties. For example, radio waves transmitted by the mobile unit 110 in an urban environment may be scattered by a large number of buildings within several meters of the location of the mobile unit 110. In contrast, radio waves transmitted by a mobile unit 110 deployed in a rural environment may only be scattered by an occasional distant building or may not be scattered (to any appreciable or detectable degree) by any structures or geographic features at all. Consequently, the radio wave signals received by the antennas 105 may be very different when the mobile unit 110 is transmitting in the different scattering environments.

The scattering environment proximate the mobile unit 110 may be modeled using a three-dimensional scattering model. In the illustrated embodiment, the scattering environment proximate the mobile unit 110 is modeled using a spherical model 120 that includes a plurality of scatterers 125 (only one indicated in FIG. 1). For example, the dimensions of the spherical model 120 may be selected to correspond to a particular opening angle 130 at the antenna 105(4). For another example, the location of one or more of the plurality of scatterers 125 may be selected so that the scattered portion of the radio wave transmitted by the mobile unit 110 arrives at the antenna 105(2) at a particular arrival angle 135. The scattering cross sections of the scatterers 125 (as well as the frequency, wavelength, and/or polarization dependence thereof) may also be selected. In one embodiment, the properties of the spherical model 120 and/or the scatterers 125 may also be selected to account for relative motion of the mobile unit 110, the scatterers 125, and/or the antennas 105, as will be discussed in detail below.

The properties of the scattering model 120 and/or the scatterers 125 may be associated with a real or a fictitious scattering environment. In one embodiment, the scattering model 120 may be determined using field tests in a particular scattering environment. For example, measurements of transmitted and/or received signals from a mobile unit 110 in an urban environment may be used to define the properties of the scattering model 120. Alternatively, the scattering model 120 may be determined empirically and/or theoretically. For example, the scattering model 120 may be a representation of a fictitious scattering environment that may be used for simulating and/or testing portions of the wireless communication system 100 before, during, or after deploying the antennas 105 and/or the mobile units 110.

The three-dimensional scattering model 120 may be used to determine one or more correlations between portions of signals received by the antennas 105. In one embodiment, the three-dimensional scattering model 120 may be used to determine a temporal correlation, one or more spatial correlations, and one or more polarization correlations between portions of signals transmitted by the mobile unit 110 and received by the antennas 105. For example, the antennas 105 may be deployed in a cross-polarization configuration to implement four-branch receiver diversity at a base station associated with the antennas 105. The temporal, spatial, and/or polarization correlations between the antennas 105 may then be determined based on the three-dimensional scattering model 120. In one embodiment, the spatial correlations may be represented as a spatial correlation length 145 associated with pairs of antennas 105. The polarization correlations may also be represented as a polarization correlation length 150 associated with pairs of antennas 105.

Fading coefficients associated with the antennas 105 may also be determined using the correlations. As used herein and in accordance with common usage in the art, the term "fading coefficients" will be understood to refer to a coefficient that may be used to generate a signal received at one or more of the antennas 105 based on knowledge of the signal transmitted by the mobile unit 110. For example, a fading coefficient associated with the antenna 105(1) may be convolved with the signal transmitted by the mobile unit 110 to generate the signal (or an estimate thereof) received by the antenna 105(1). In one embodiment, the fading coefficients may be represented as a time series of complex numbers, e.g., the values of I and Q coefficients representative of the radio wave intensity at each millisecond.

Figure 2:
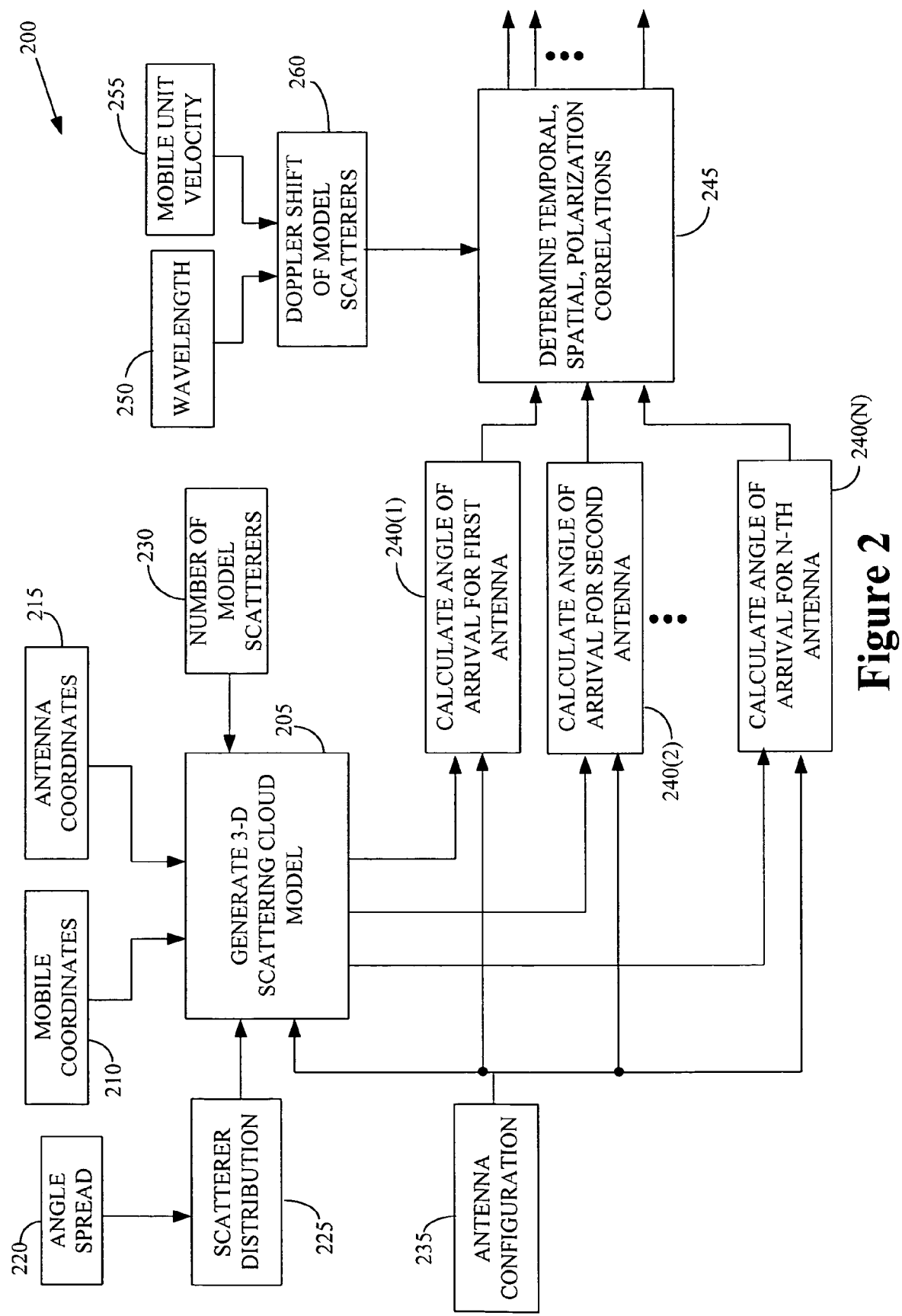
FIG. 2 conceptually illustrates one exemplary embodiment of a method for determining one or more correlations associated with a three-dimensional scattering cloud model, in accordance with the present invention and FIG. 3 conceptually illustrates one exemplary embodiment of a method of determining fading coefficients for a plurality of antennas, in accordance with the present invention.

FIG. 2 conceptually illustrates one exemplary embodiment of a method 200 for determining one or more correlations associated with a three-dimensional scattering cloud model. In the illustrated embodiment, a three-dimensional scattering cloud model is generated (at 205) using information associated with the scattering environment proximate the mobile unit. For example, mobile coordinates (at 210) and/or antenna coordinates (at 215) may be provided and used to generate (at 205 the three-dimensional scattering cloud model. An angle spread may also be provided (at 220) and used to determine (at 225) the distribution of scatterers for the three-dimensional scattering cloud model. For example, the angle spread associated with a particular scattering environment may be determined using field tests and/or theoretical or empirical models of the scattering environment. A number of scatterers that is to be included in the three-dimensional scattering cloud model may also be selected (at 230).

The configuration (at 235) of the plurality of antennas may also be used to determine the fading coefficients of the antennas. In one embodiment, information indicative of the antenna configuration may be used to generate (at 205) the three-dimensional scattering cloud model. The information indicative of the antenna configuration may also be used to calculate (at 240) arrival angles for each of the antennas. In one embodiment, information indicative of the three-dimensional scattering cloud model and the antenna configuration is combined to generate (at 240) a distribution of arrival angles for radio waves generated at the location of the mobile unit, scattered by the model scatterers, and then received by each of the antennas. In one embodiment, the distribution of arrival angles for the radio waves may also include information indicative of the frequency and/or wavelength distribution associated with each arrival angle, as well as the distribution of polarization associated with each arrival angle.

One or more correlations associated with radio waves received by each of the antennas may then be determined (at 245). For example, as discussed above, an effective or characteristic length indicative of the spatial and/or polarization correlations may be determined (at 245). In the illustrated embodiment, temporal, spatial, and/or polarization correlations may be determined (at 245) based on the distribution of arrival angles for radiation received by each of the antennas. A wavelength or frequency (at 250) associated with a portion of the transmitted radio wave and a velocity of the mobile unit (at 255) transmitting the radio wave may be used to generate (at 260) a Doppler shift associated with each of the model scatterers. The Doppler shift may then be used to determine the temporal, spatial, and/or polarization correlations. In one embodiment, the determined correlations may be used to determine one or more antenna fading coefficients.

Figure 3:
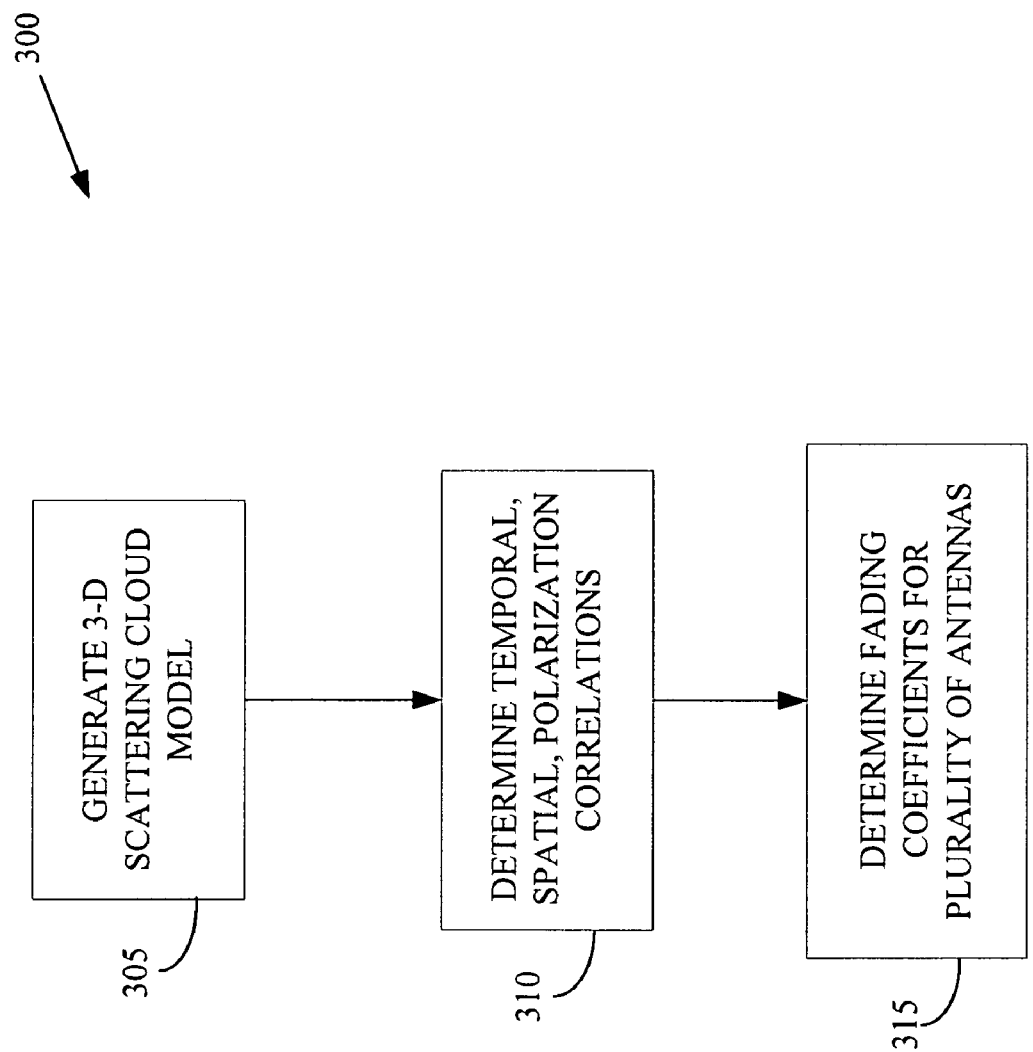

FIG. 3 conceptually illustrates one exemplary embodiment of a method 300 of determining fading coefficients for a plurality of antennas. In the illustrated embodiment, a three-dimensional scattering cloud model is generated (at 305). For example, a spherical scattering cloud model including a plurality of scatterers may be generated (at 305) based on field testing or empirical or theoretical considerations. Temporal, spatial, and/or polarization correlations between signals received at each of the plurality of antennas may then be determined (at 310) using the three-dimensional scattering cloud model, as discussed in detail above. Fading coefficients associated with each of the plurality of antennas may then be determined (at 315) based on the correlation statistics. For example, the temporal, spatial, and/or polarization correlation statistics may be used to instantiate a three-dimensional coordinate of each scatterer within the scattering cloud according to a specified scatterer distribution model. Ray tracing may then be carried out to calculate microscopic channels that connect the mobile unit with each antenna at the base station via each scatterer. The fading coefficients at each base station antenna may then be determined (at 315) as the linear superposition of the microscopic scatterer-dependent channels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method implemented in a wireless communication system, comprising:

accessing, in a computer system, information that characterizes a scattering environment proximate a mobile unit and information indicating a configuration of a plurality of antennas;

generating, in the computer system, a three-dimensional scattering cloud model using said information, the three-dimensional scattering cloud model representing the scattering environment as seen by the plurality of antennas; and determining, in the computer system, at least one correlation between portions of signals received at the plurality of antennas using the three-dimensional scattering cloud model, wherein determining said at least one correlation comprises determining at least one of a temporal correlation of portions of a time series of the signal, a spatial correlation between portions of the signal, and a polarization correlation between portions of the signal.

2. The method of claim 1, wherein generating the three-dimensional scattering cloud model comprises generating the three-dimensional scattering cloud model based on at least one of a coordinate of the mobile unit, a number of scattering entities proximate the mobile unit, an angle spread of the scattering entities, and a distribution of the scattering entities.

3. The method of claim 1, wherein generating the three-dimensional scattering cloud model comprises determining the information that characterizes the scattering environment based on at least one of a field test, empirical data, and theoretical data.

4. The method of claim 1, wherein generating the three-dimensional scattering cloud model comprises generating the three-dimensional scattering cloud model based on at least one of a polarization associated with at least one of the plurality of antennas and a coordinate of at least one of the plurality of antennas.

5. The method of claim 1, wherein generating the three-dimensional scattering cloud model comprises generating the three-dimensional scattering cloud model that has a selected number of model scatterers and a selected distribution of model scatterers.

6. The method of claim 1, wherein determining the spatial correlation comprises determining a first effective distance between at least two of the plurality of antennas and determining the polarization correlation comprises determining a second effective distance between at least two of the plurality of antennas.

7. The method of claim 1, wherein determining said at least one correlation comprises concurrently determining the temporal correlation, at least one spatial correlation, and at least one polarization correlation.

8. The method of claim 1, wherein determining said at least one correlation comprises determining said at least one correlation based on at least one of a wavelength or a frequency associated with a received signal, a velocity of the mobile unit, and a Doppler shift associated with at least one model scatterer.

9. The method of claim 1, wherein determining said at least one correlation comprises determining at least one angle of arrival associated with at least one model scatterers and at least one of the plurality of antennas.

10. The method of claim 1, further comprising determining at least one fading coefficient associated with at least one of the plurality of antennas based on said at least one correlation.

11. The method of claim 1, further comprising determining a plurality of three-dimensional scattering cloud models based on the scattering environment proximate the mobile unit and the configuration of the plurality of antennas.

12. The method of claim 11, wherein determining the plurality of three-dimensional scattering cloud models comprises determining a plurality of three-dimensional scattering cloud models corresponding to a plurality of resolvable paths from the mobile unit to at least one of the plurality of antennas.

13. The method of claim 1, further comprising determining fading coefficients for channels between the mobile unit and each of the plurality of antennas using the three-dimensional scattering cloud model.

14. The method of claim 13, wherein determining the fading coefficients comprises using ray tracing to calculate a plurality of channels that connect the mobile unit with each antenna via each scatterer in the three-dimensional scattering cloud model.

15. The method of claim 14, wherein determining the fading coefficients comprises forming a linear superposition of the channels calculated using ray tracing.

* * * * *